3,810,781
METHOD OF STABILIZING HEPARINIZED NON-THROMBOGENIC PLASTIC SURFACES
Jan Christer Eriksson, Vastra Frolunda, and Hans Ragnar Lagergren, Stockholm, Sweden, assignors to Aminkemi Aktiebolag, Bromma, Sweden
Filed Oct. 4, 1971, Ser. No. 185,954
Claims priority, application Sweden, Oct. 5, 1970, 13,458/70; Apr. 7, 1971, 4,506/71
Int. Cl. A61f 1/00; A61k 17/18; B44d 1/44
U.S. Cl. 117—47 A
17 Claims

ABSTRACT OF THE DISCLOSURE

A method for stabilizing heparinized plastic surfaces which previously have been made non-thrombogenic by bonding or heparin to surface-bonded cationic groups, by treating such heparinized surfaces with a dilute aqueous solution of a dialdehyde having 0–4 and preferably 3 $CH_2$ groups between the two aldehyde groups, thereby to cross-link the bonded heparin molecules to each other.

In medicine and medical technology, particularly during recent years, investigators have studied and worked on problems related to thrombosis and blood-clotting that is caused by the contact of blood with an extraneous surface. These investigations have as their practical purpose to minimize the risks of complications, e.g. during catheterizing, the use of heart valve and vascular prosthesis, blood transfusion, the drainage of wounds, etc. In the heart-lung-machine there is a similar difficulty which is also due to the contact of blood with a surface having chemical properties which differ considerably from the properties of natural blood-vessels and which, consequently, initiate the coagulation of blood. Likewise, during storing and sampling of blood, the contact with foreign surfaces gives rise to considerable inconveniences on account of the activation of blood coagulation.

In some cases, the consequences of the contact reaction (thrombosis, blood coagulation) can be effectively counteracted by the addition of heparin or sodium citrate to the blood. However, rather often the use of such additives has also severe disadvantages. Therefore, attempts have been made to prepare so-called non-thrombogenic surfaces which have such chemical properties that thrombosis and coagulation are substantially precluded. A plurality of surfaces especially prepared for this purpose have now been tested biologically with respect to their properties when contacted with blood and it has been shown that heparinized plastic surfaces in general exhibit the most favorable test results in vivo as well as in vitro. Accordingly, this type of non-thrombogenic surface is most suitable for various applications in medicine and medical technology.

Heparinized non-thrombogenic plastic surfaces can be prepared in several ways, known per se. The most commonly used of these methods is based on first introducing positively charged cationic groups in the surface zone of the plastic. This first step can be carried out by means of different chemical reaction methods (cf. e.g. R. I. Leininger et al., Science, 152, 1625 (1966); Trans. Am. Soc. Artif. Int. Organs, 12, 151 (1966); J. Biomed. Mater. Res. 1, 239 (1967) and further E. W. Merrill et al., Trans. Am. Soc. Artif. Organs, 12, 139 (1966) or, alternatively, by means of a physical surfactant sorption technique, cf. J. C. Eriksson, H. R. Lagergren, A. L. Johansson, E. G. Gillberg, British Pat. 1,130,345, U.S. application Ser. No. 510,355, filed Nov. 29, 1965, now abandoned, U.S. application Ser. No. 738,826, filed June 21, 1968, now U.S. Pat. No. 3,634,123 and G. A. Grode, Artifiical Heart Program Conf., Washington, June 1969). Thereafter, the surface zone of the plastic containing the cationic groups is treated with a solution of Na-heparin.

Concerning the molecular structure of the heparinized surface a series of research results now available indicates that only one heparin ion (molecular weight about 12,000–16,000) is bonded to each cationic group in the surface and that consequently one is dealing with a case of "upright" adsorption (or rather chemi-sorption) of the heparin polymer chains. The surface concentration of heparin is usually 1–5 IU/cm.$^2$ (125 IU≈1 mg.). Based upon this simple structural model it is readily understood why the biological anticoagulation activity of the heparin is retained by the bonding to the cationic groups of the plastic surface, as the predominant part of each heparin polymer chain remains chemically unaffected.

More recent investigations in different laboratories principally based on the use of $^{35}$S-labelled heparin and so-called thrombin titration have clearly shown, however, that the ionic bond of heparin to the cationic groups in the plastic surface is unstable during contact with blood or plasma. Most probably the adsorption equilibrium heparin in solution⇌heparin on surface, which is strongly displaced to the right with water (or physiological saline solution) as solvent, is altered in desorptive direction by contact with blood or plasma with elution of heparin from the plastic surface as a consequence. Under stationary conditions (no stirring) the half-life of heparin desorption from the surface is about 5 hours. Thus, after a contact period of this duration the surface concentration of heparin has decreased to half of the starting value. The rate of desorption, however, is strongly dependent on the kind of cationic groups and is often higher than the one corresponding to this half-life. In contact with flowing blood, the half-life may in some cases be as low as 20 minutes, and such contact may cause the surface concentration of heparin to decrease to 5% of the initial concentration already after 2 hours.

The circumstance that the ionic bonding of heparin to the cationic groups in the plastic surface is so unstable upon contact with blood constitutes a considerable disadvantage, of course, from the point of view of medical applications because the non-thrombogenic properties of the surface are lost in a rather short time and simultaneously the exposed blood becomes heparinized. Only so-called short term applications involving blood contact of short duration can be carried out with such unstable heparinized surfaces.

The present inventors have now considered whether it would be possible, starting from a plastic surface that has been heparinized by ionic bonding of heparin to cationic groups in the surface, to stabilize the heparinized surface in a subsequent step without losing the anti-coagulation activity of the surface-bonded heparin. As a working hypothesis they have started with the idea that the desorption during contact with blood might be considerably counteracted by cross-linking the heparin chains so as to form a heparin network which is bonded to the plastic surface at several points through the cationic groups.

A solution of this problem has been discovered which involves an after-treatment of the heparinized surface with a dialdehyde under suitable reaction conditions. Thus, our research results indicate that the aldehyde groups of a dialdehyde can be reacted with OH-groups in different heparin chains so that cross-links are formed.

Hence, the invention consists of a method for stabilization involving after-treatment of such plastic surfaces which have been made non-thrombogenic by ionic bonding of heparin to surface-bonded cationic groups by any of the methods described above, and is mainly characterized by the feature that such heparinized surface is brought into contact with a diluted aqueous solution of a dialdehyde.

The molecular structure of the dialdehyde should be such that the distance between the aldehyde groups is sufficient to enable cross-linking between neighboring heparin chains. Longer hydrocarbon chains, i.e. 3–4 $CH_2$-groups between the aldehyde groups are utilizable at higher as well as lower surface concentrations of heparin whereas shorter hydrocarbon chains, i.e. 0–2 $CH_2$-groups are only utilizable at higher surface concentrations of heparin. Therefore, glutardialdehyde having 3 $CH_2$-groups between the two aldehyde groups is preferably used. In many cases, especially when the dialdehyde is comparatively unstable, it can be most convenient to prepare the dialdehyde in the reaction solution by decomposing the corresponding acetal.

As is evident from the above description, the main principle of the invention is to treat the heparinized surface under suitable conditions with a water solution containing a dialdehyde or a water solution in which the dialdehyde can be formed by decomposition of the corresponding acetal. A high pH value might cause condensation of the dialdehyde. Therefore, the pH value should be lower than 10 and preferably lower than 7. If one starts with an aldehyde the treatment can be carried out at that pH value which is normally obtained when dissolving the dialdehyde, i.e. pH=4–5 but it is also possible to work at a lower pH, e.g. pH=2. When starting with the corresponding acetal, acidifying is necessary, as a rule, with e.g. HCl. It is not advisable, however, to work at appreciably lower pH values than about 2 since in such cases there is a risk of hydrolytic decomposition of the heparin, particularly at elevated temperatures, cf. Example 4 in Tables 1 and 2.

Other reaction conditions such as concentration, temperature and time can vary somewhat dependent upon which dialdehyde or acetal is used. As is seen from a series of experiments with glutardialdehyde as the stabilizing agent, the conditions are relatively independent of variations within wide ranges. The reason why glutardialdehyde was chosen for these investigations was that it was found to have a satisfactory effect and further that it is already accepted in medicine as disinfectant.

The plastic materials which may be used in the present invention include polyethylene, polypropylene, polyvinyl chloride, polystyrene, polytetrafluoroethylene, and the like. Thus, the polyolefins and also the general class of thermoplastics are suitable. Elastomers and cellulose derivatives can also be rendered non-thrombogenic by the invention.

In one embodiment of the present invention, as stated above, the cationic group may be bonded to the plastic surface by the method described in the copending U.S. application of Eriksson et al., Ser. No. 738,826, now U.S. Pat. No. 3,634,123, wherein the plastic surface is treated with a cationic surface active agent preferably in an aqueous medium at a temperature sufficiently elevated so as to cause adsorption of the cationic agent onto the surface. The elevated temperature is believed to increase the permeability of the molecular structure of the plastic. The increased permeability allows the hydrophobic end of the molecule, e.g. the alkyl chain of the surface active molecule, to become primarily and subsequently permanently fixed to the plastic surface.

In order to form a firm bond between the surface and the surface active agent it is preferred to use a surface active agent containing an alkyl chain of at least 4 carbon atoms. Surface active agents having a long hydrocarbon chain are preferred, particularly those containing a hydrocarbon chain of from 12 to about 18 carbon atoms.

Suitable cationic surface active agents can be of a varied nature and include primary, secondary, tertiary amines, and their salts, as well as quaternary ammonium compounds, pyridinium, and guanidium salts which have a least one alkyl group with a chain length longer than 2 carbon atoms and preferably longer than about 8 carbon atoms. In the secondary, tertiary, and quaternary ammonium compounds, respectively, the nitrogen atom can bear 1, 2, and 3 hydrocarbon groups, such as a lower alkyl group, e.g., methyl, ethyl, or propyl; a benzyl, or an alkylol group, or the nitrogen atom can bear one or two hydrocarbon groups having an arbitrary chain length.

Another class of suitable cationic surface active agents are the alkyl ammonium salts of the formula:

wherein X is a halogen and y is a number of at least about 4 and preferably from about 8 to about 18.

Since primary amines provide stronger heparin complexes than other ammonium salts of equivalent chain length, it is preferred to use primary amines as the surface active agents in the treatment of chemically inert plastics.

The primary amines are generally employed in the salt form, i.e. as a salt made by adding HCl, HBr or HI. Water solutions of salts of primary amines are preferred in the process of Ser. No. 738,826, now U.S. Pat. No. 3,634,123, cited above since the amine molecules absorbed onto the plastic surface from these solutions are to a large extent ionized whereas this is not normally the case for solutions formed by dissolving amine in e.g. organic solvents. The Krafft point is the temperature at which the solubility of the surface active agent suddenly increases and provides homogeneous solutions. Absorbed amine molecules are more difficult to rinse off. Accordingly, if water or an aqueous solution is used for rinsing the plastic articles after treatment with the surface active agent, the temperature of the water should preferably be above the Krafft point of the surface active agent.

Following is a general description of the drawings which illustrate certain features of the present invention.

Figure 1:
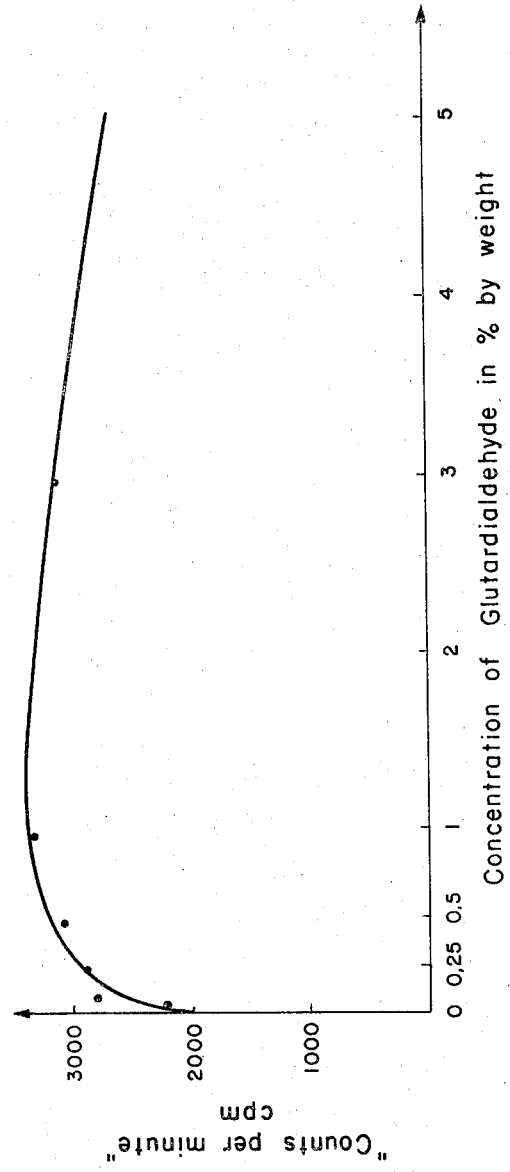
FIG. 1 is a graphical illustration of the relationship between the concentration of glutardialdehyde employed to treat the heparinized surface and the amount of heparin retained by that surface on subsequent washing.
Figure 2:
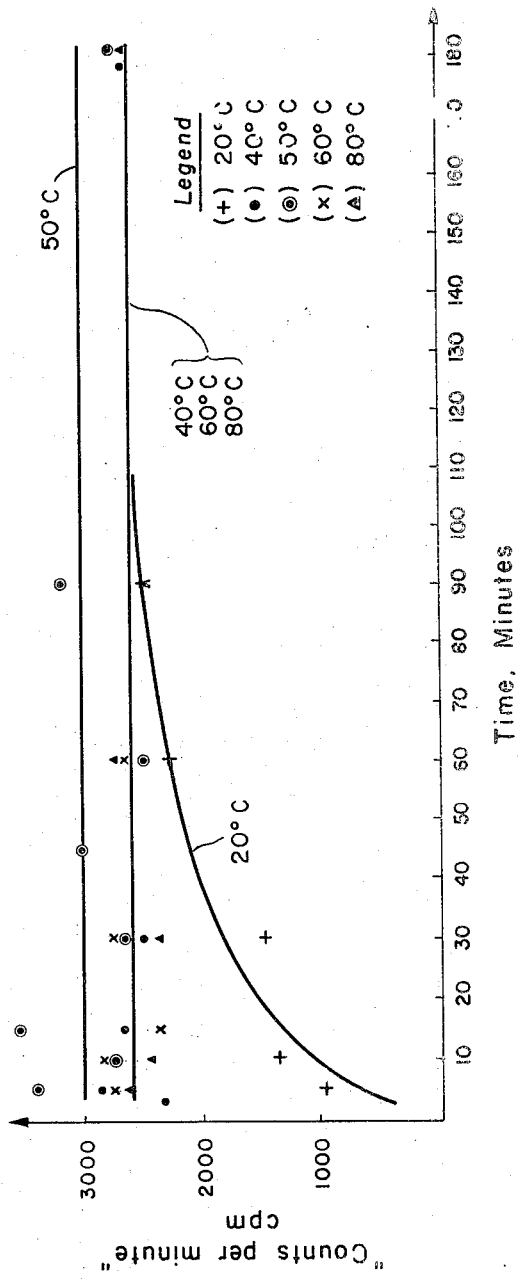
FIG 2 is a graphical illustration of the relationship between the amount of heparin retained by the heparinized surface and the time of treatment at various temperatures.

The results of the experiments with glutardialdehyde are shown on FIGS. 1 and 2. In all cases, test tubes of polypropylene were treated first with 1 mM. octadecylaminopropylamine-hydrochlorine solution for 2 hours at 95° C. for the introduction of cationic groups in the surfact zone. Heparinization has then been carried out with 10 IU/ml. heparin solution containing $^{35}$S-labelled heparin at 75° C. during 4 hours. 1.2 IU/cm.$^2$ is approximately the resulting surface concentration of heparin on treated polypropylene immediately after the heparinization step. After the heparinization step, the treatment with glutardialdehyde was made. To determine the degree of stabilization obtained, the counting rate of $^{35}$S was measured after a subsequent exposure to 25% NaCl-solution at 37° C. during 5 hours. In cases where no treatment with glutardialdehyde was performed such an after-treatment with 25% NaCl-solution normally results in an almost complete elution of heparin so that the remaining surface concentration only corresponds to a count rate of 400 c.p.m. ("counts per minute"). Under these conditions 1 IU/cm.$^2$ heptarin corresponds to about 300 c.p.m.

FIG. 1 illustrates the remaining surface concentration measured in c.p.m. as a function of the concentration of glutardialdehyde in the treatment solution at a treatment temperature of 50° C. and treatment time of 60 minutes without addition of any acid. As is seen, satisfactory stability is obtained within such wide concentration limits as from 0.1 to 5% of weight. From this diagram it is also seen that a noteworthy stabilizing effect can be observed already at a concentration of about 0.025%.

FIG. 2 illustrates the remaining surface concentration of heparin measured in c.p.m. as a function of the time of treatment at different temperatures, at pH=2 and with a concentration of glutardialdehyde of 3.6%. From the diagram it is seen that a satisfactory stability is obtained by choosing a time of treatment which at 40–80° C. does not need to exceed 5 minutes and that the effect is not lessened when the treatment time is extended to 60 minutes or more. Treatment at room temperature (20° C.) requires longer treatment times, about 90 minutes for satisfactory stabilization. As a rule, treatment with glutarialdehyde at 50° C. seems to give optimal results.

treated in this way, are illustrated by test data given in Tables 2 and 3 below. In Table 1 there is stated how the corresponding samples have been prepared. In all these cases heparinization was performed according to U.S. patent application Ser. No. 510,355, filed Nov. 29, 1965, now abandoned, and Ser. No. 738,826, filed June 21, 1968, now Pat. No. 3,634,123, both of which are incorporated herein by reference.

TABLE 1.—PREPARATION OF SAMPLES

| Sample number | Plastic | Treatment with cationic tenside | Heparinization | Stabilizing treatment |
|---|---|---|---|---|
| 1 | Polypropylene (test tubes). | 1 mM. cetylamine hydrochloride, 2 hr., 95° C. | 5 IU/ml., 4 hr., 75° C., pH=3 | Glutardialdehyde. 3.6%, pH=2, 10 min., 60° C. |
| 2 | do | 1 mM. octadecyl aminopropylamine hydrochloride, 2 hr., 90° C. | 10 IU/ml., 4 hr., 75° C., pH=3 | Same, but at 50° C. |
| 3 | do | do | 10 IU/ml., 4 hr., 75° C., pH=3 | Glutardialdehyde, 1% without addition of acid, 10 min., 50° C. |
| 4 | do | do | 10 IU/ml., 4 hr., 75° C., pH=3 | Glutardialdehyde, 3.6%, pH=2, 24 hr., 75° C. |
| 5 | Polyvinyl chloride (tube). | 1 mM. octadecyl aminopropylamine hydrochloride, 0.5 hr., 95° C. | 5 IU/ml., 4 hr., 75° C., pH=3 | Glutardialdehyde, 3.6%, pH=2, 60 min., 60° C. |
| 6 | Polypropylene (test tube). | 1 mM. octadecyl aminopropylamine hydrochloride 2 hr., 90° C. | 10 IU/ml., 4 hr., 75° C., pH=3 | 1,1,3,3-tetraethyoxypropane, 2%, pH=2, 60 min., 60° C. |
| 7 | Polyethylene | do | 10 IU/ml., 4 hr., 75° C., pH=3 | Glyoxal, 1% without addition of acid, 10 min., 60° C. |
| 8 | Polyethylene (catheter) | 1 mM. cetylamine hydrochloride, 2 hr., 90° C. | 5 IU/ml., 4 hr., 75° C., pH=3 | Glutardialdehyde, 3.6%, pH=2, 10 min., 60° C. |
| 9 | do | 1 mM. octadecyl aminopropylamine hydrochloride, 2 hr., 95° C. | 5 IU/ml., 4 hr., 75° C., pH=3 | Do. |
| 10 | do | do | 10 IU/ml., 4 hr., 75° C., pH=3 | Glutardialdehyde, 1%, without addition of acid, 10 min,. 55° C. |

After each treatment the test pieces were washed several times with distilled water.

TABLE 2.—RESULTS OF TESTS IN VITRO

| Sample number | Treatment for stabilizing test | Remaining surface concentration of heparin, percent of initial | | Coagulation time for blood in contact with sample/coagulation time for same blood upon subsequent contact with glass (minutes) | | Corresponding coagulation times after treatment of the test pieces according to column 2, this table—with stabilization |
|---|---|---|---|---|---|---|
| | | With stabilization | Without stabilization | With stabilization | Without stabilization | |
| 1 | Plasma, 15 hr., 37° C | 75 | 1 | >120/8 | >120/>60 | |
| 2 | 25% NaCl—solution, 5 hr., 37° C | 80 | 10 | >180/12 | >120/>120 | >120/10 |
| 2 | Plasma, 15 hr., 37° C | 70 | 10 | >180/12 | >120/>120 | >120/9 |
| 3 | 25% NaCl—solution, 5 hr., 40° C | 65 | 10 | >120/11 | >120/>120 | >120/9 |
| 3 | Blood with citrate, 4 hr., 37° C., stirring | 60 | 5 | >120/11 | >120/>120 | >120/7 |
| 4 | Plasma, 3 hr., 37° C | 95 | 60 | ¹24 | >120/>120 | ¹17 |
| 5 | Blood, 3 hr., 37° C | 85 | 50 | >120/>60 | >120/>120 | 120/15 |
| 6 | 25% NaCl—solution, 5 hr., 37° C | 35 | 10 | | | |
| 7 | Blood with citrate, 2 hr., 37° C | 65 | 50 | | | |

¹ Coagulation occurred, and therefore subsequent contact with glass could not be established.

TABLE 3.—RESULTS OF TESTS IN VIVO

| Sample number | Special treatment after stabilization step | Treatment for testing stability | Remaining surface concentration of heparin in percent of initial ¹ | | Time for thrombosis in hours | |
|---|---|---|---|---|---|---|
| | | | With stabilization | Without stabilization | With stabilization | Without stabilization |
| 8 | | Streaming blood, in vivo, 3 hr | 60 | 1 | >12 | 3 |
| 9 | | do | 65 | 4 | >12 | 3 |
| 10 | Streaming physiological NaCl solution, 1 hr., 60° C | do | 100 | 25 | >9 | 4 |
| 10 | do | Streaming blood, in vivo, 9 hr | 100 | | 9 | 4 |

¹ Based on concentration before treatment for testing stability.

We have further found that for fully preserving the biological heparin activity it is important that treatment with acidified dialdehyde (or acetal) solution be not continued for periods which are too long. In acid solution (pH<3) and particularly at elevated temperature, a successive hydrolytic decomposition of heparin occurs with a resulting decreasing biological activity (cf. test No. 4 in Tables 1 and 2 below). Therefore, the conditions for stabilizing with 0.1–5% glutardialdehyde solution at 50° C. should be chosen such that the concentration in percent by weight times treatment time in minutes is ≥5 and that the treatment time is ≤180 minutes. In practice we have found treatment with 1% solution of glutardialdehyde without addition of acid during 10 minutes at 50° C. to convenient and satisfactory.

The stabilizing effect of the treatment of heparinized surfaces according to the invention, as well as some properties upon contact with blood of heparinized surfaces Table 2 shows that not all of the heparin has been stably bonded to the surface by the stabilizing treatment. Thus, normally on contact with blood or plasma a desorption of a certain quantity of unstably bonded heparin takes place. Such heparin can be removed before use, e.g. through contact with 25% NaCl-solution at 37° C. Blood which has been kept for several days in a vessel with heparinized and glutardialdehyde-treated surface which has been treated with 25% NaCl-solution at 37° C. after the stabilizing step coagulates after transfer to a glass tube normally within 5–10 minutes. This indicates that no heparin has been eluted to the blood. An after-treatment with 25% NaCl-solution after the stabilizing step thus has the effect that the heparinized surface becomes practically completely stable to contact with blood. In some cases, the removal of non-stabilized heparin can also be carried out by rinsing with distilled water or with physiological NaCl-solution at about 50–80° C. (cf. sample 10 in Tables 1 and 3 above, wherein the very high figure (100%) for the remaining surface concentration results from the fact that the treatment with streaming blood was made on the sample on which all non-stabilized heparin had been rinsed away by the NaCl-solution).

What is claimed is:

1. In the process of heparinizing a plastic surface by bonding heparin to surface-bonded cationic groups to form a non-thrombogenic plastic surface, the improvement which comprises contacting subsequently the heparinized plastic surface with a dilute aqueous solution having a dialdehyde with 0–4 $CH_2$ groups between the two aldehyde groups and having a pH lower than about 10 but not less than about 2, thereby to stabilize the heparinized surface.

2. A method as claimed in claim 1 wherein the dialdehyde contains 3 $CH_2$ groups between the two aldehyde groups.

3. A method as claimed in claim 1 wherein the dialdehyde is prepared by decomposing the corresponding acetal in the treating solution in situ in contact with the heparinized surface.

4. A method as claimed in claim 1 wherein the treatment with dialdehyde is carried out with a water solution of glutardialdehyde.

5. A method as claimed in claim 4 wherein the dialdehyde solution contains about 0.1 to 5% by weight of dialdehyde and the treatment with the dialdehyde is for a period of about 1 minute to 3 hours and a temperature between about 20° and 80° C.

6. A method as claimed in claim 5 wherein the treatment is carried out in a 1% by weight glutardialdehyde solution for about 10 minutes at about 50° C.

7. A method as claimed in claim 4 wherein the concentration and percent by weight of glutardialdehyde times the treatment time in minutes is equal to or greater than 5, and the treatment time is equal to or less than 3 hours.

8. A method as claimed in claim 1 wherein the pH of the aqueous solution is about 4–5.

9. A method as claimed in claim 1 wherein the plastic surface is a polyolefin surface.

10. A method as claimed in claim 1 wherein the plastic surface is a polyvinyl chloride surface.

11. A method as claimed in claim 1 wherein the plastic surface is a silicone resin surface.

12. A method as claimed in claim 1 wherein the cationic group is a primary, secondary or tertiary amine or salt thereof or a quaternary ammonium group.

13. A method as claimed in claim 1 wherein the cationic group has an alkyl chain of at least 4 carbon atoms.

14. A method as claimed in claim 1 wherein the plastic is a thermoplastic.

15. A method as claimed in claim 1 wherein the cationic group has an alkyl chain of about 12 to about 18 carbon atoms.

16. A method as claimed in claim 1 wherein the pH of the aqueous dialdehyde solution is lower than 7, but not less than about 2.

17. A product having a heparinized plastic surface in which the heparin is bonded to the surface by cationic groups and stabilized by subsequent reaction with a dialdehyde according to the process described in claim 1, thereby to make such surface substantially non-thrombogenic.

References Cited

UNITED STATES PATENTS

| | | | |
|---|---|---|---|
| 3,617,344 | 11/1971 | Leininger et al. | 117—47 A |
| 3,673,612 | 7/1972 | Merrill et al. | 442—183 |

FOREIGN PATENTS

| | | |
|---|---|---|
| 1,459,646 | 10/1966 | France. |

OTHER REFERENCES

Falb et al.: "Development of Blood-Compatible Polymeric Materials," Battelle Memorial Institute (1966), pp. 13–14.

WILLIAM D. MARTIN, Primary Examiner

W. H. SCHMIDT, Assistant Examiner

U.S. Cl. X.R.

3—1; 117—62.1, 62.2, 138.8 B, 138.8 E, 138.8 UA; 424—183

UNITED STATES PATENT OFFICE
CERTIFICATE OF CORRECTION

Patent No. 3,810,781      Dated May 14, 1974

Inventor(s) J. C. Eriksson et al.

It is certified that error appears in the above-identified patent and that said Letters Patent are hereby corrected as shown below:

Col. 1, line 17, "or" should read -- of --;
Col. 1, last line, "Artifiical" should read -- Artificial --;
Col. 4, lines 48 & 49, "surfact" should read -- surface --;
Col. 4, line 64, "300" should be -- 3000 --;
Col. 5, second line following Table 1, "glutarialdehyde" should be -- glutardialdehyde --;
Col. 5, line 72, after "to" insert -- be --.

Signed and sealed this 3rd day of December 1974.

(SEAL)
Attest:

McCOY M. GIBSON JR.
Attesting Officer

C. MARSHALL DANN
Commissioner of Patents